W. S. BARTON.
Seed-Planters.

No. 146,422. Patented Jan. 13, 1874.

Witnesses.
Ernst Bilhuber.
Henry Gentness.

Inventor.
William S. Barton
Van Santvoord & Hauff
attys

UNITED STATES PATENT OFFICE.

WILLIAM S. BARTON, OF ORANGEBURG, SOUTH CAROLINA.

IMPROVEMENT IN SEED-PLANTERS.

Specification forming part of Letters Patent No. 146,422, dated January 13, 1874; application filed September 8, 1873.

*To all whom it may concern:*

Be it known that I, WILLIAM S. BARTON, of Orangeburg, in the county of Orangeburg and State of South Carolina, have invented a new and useful Improvement in Seed-Planters; and I do hereby declare the following to be a full, clear, and exact description thereof, which will enable those skilled in the art to make and use the same, reference being had to the accompanying drawing forming part of this specification, in which drawing—

Figure 1:
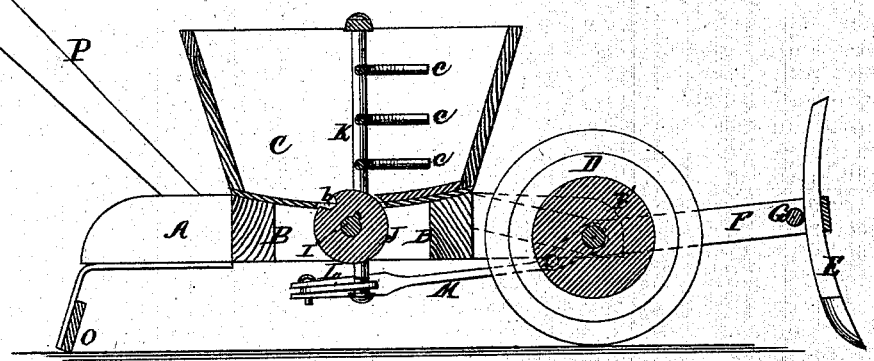
Figure 2:
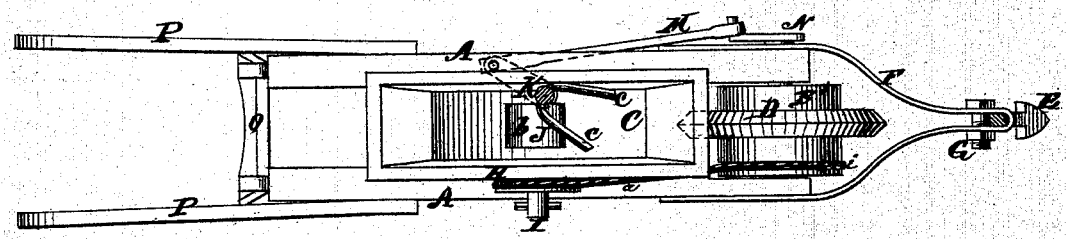

Figure 1 represents a longitudinal vertical section of this invention. Fig. 2 is a plan or top view of the same.

Similar letters indicate corresponding parts.

This invention relates to certain improvements in seed-planters, and consists in providing the hub of the driving-wheel with an angular-shaped tread, and with a groove to receive an endless belt for operating the seed-dropper, and with a crank connected with the agitator, by means of a connecting-rod and pivoted lever, the parts being combined as hereinafter specified, so that the agitator and dropper are simultaneously operated when the machine is in motion, and a uniform deposit of seed upon the ground insured.

In the drawing, the letter A designates sills, on which are cross-bars B B that support the hopper C, and such sills also form the bearing for a wheel, D, which serves to support the planter on the ground. Said wheel D is angular or V-shaped on its circumference or periphery, so that the same will readily sink into soft ground, and when the planter is in use said wheel travels in a furrow formed by a drill or plow, E, which slides in the end of a bracket, F, extending from the front end of the sills A, and is clamped in said bracket by means of a set-screw, G; and the same can be adjusted in any position, being made to slide in its said supporting-bracket F, and thereby furrows or trenches of any desired depth can be formed in the ground. In cases where it is desirable to plant the seed at a small depth, in soft garden-soil, the furrowing-plow E can be entirely dispensed with, and a small indentation or groove formed by means of the angular driving-wheel D alone. The hub of the wheel D serves to impart a revolving motion to a pulley, H, by means of a band, a, (see Fig. 2,) which pulley is mounted on a shaft, I, which extends under the hopper C, and supports a drop-wheel, J, that is feathered on such shaft, and is provided with a feed-mouth, b, which is alternately brought into the hopper C when such drop-wheel is revolved, and serves to deposit or plant the seed at equal distances apart in the furrow formed by the drill E. Drop-wheels of different dimensions are provided for planting different kinds of seed, the shaft I allowing of its removal to adjust said wheels in position in the bottom of the hopper. In said hopper C is a vertical rock-shaft or spindle, K, on which are secured branches or agitating-arms c c, and the lower end of said rock-shaft extends beyond the floor of the hopper, and is provided with a lever, L, which is connected, by means of a rod, M, with a crank, N, secured to the axle of the driving-wheel D; and, by these means, an oscillating motion is imparted to the agitating-arms c c when the planter is driven over the ground, and thereby the seed in the hopper C is directly urged into the feed-mouth of the drop-wheel J. On the rear of the sills A is secured a follower, O, which serves to close up the furrow formed by the drill E, and thereby the seed is planted or embedded in the ground.

Poles or tongues may be secured on the front of the planter to receive a draft animal, or the same can be propelled by the guide or push handles P, as shown in the drawing.

What I claim as new, and desire to secure by Letters Patent, is—

The hub B', having the angular wheel D, crank N, and groove i, and connected directly with the removable dropper J in the throat of the hopper C, by the endless band a, and with the vertical agitator k c, by the crank M and pivoted lever L, all combined and operating as herein shown, for the purpose specified.

W. S. BARTON.

Witnesses:
 JAS. STOKES,
 J. W. STOKES.